United States Patent

[11] 3,572,857

| [72] | Inventor | Hisao Hasegawa<br>Nagoya, Japan |
|---|---|---|
| [21] | Appl. No. | 765,458 |
| [22] | Filed | Oct. 7, 1968 |
| [45] | Patented | Mar. 30, 1971 |
| [73] | Assignee | The Toyo Bearing Manufacturing Company Limited<br>Osaka City, Japan |

[54] ANTIFRICTION BEARING SEAL
4 Claims, 4 Drawing Figs.

[52] U.S. Cl. ................................................ 308/187.2, 277/94
[51] Int. Cl. .................................................... F16c 1/24
[50] Field of Search ........................................ 308/187.1, 187.2, 36.1; 277/82, 94, 95, 96

[56] References Cited

UNITED STATES PATENTS

| 3,163,476 | 12/1964 | McKinven | 308/187.1 |
| 3,220,756 | 11/1965 | Templeton | 308/36.1 |
| 3,396,977 | 8/1968 | Iguchi | 308/187.2 |
| 3,414,275 | 12/1968 | Takahashi | 308/187.2X |
| 3,449,029 | 6/1969 | Smith | 308/187.2 |

FOREIGN PATENTS

| 1,057,778 | 4/1953 | France | 308/187.1 |
| 1,351,942 | 12/1964 | France | 277/53 |
| 706,876 | 4/1954 | Great Britain | 308/187.2 |

OTHER REFERENCES 1169214 4/64 German Printed publication 277/94 2/2

Primary Examiner—Fred C. Mattern, Jr.
Assistant Examiner—Wesley S. Ratliff, Jr.
Attorney—Rommel and Rommel ABSTRACT: A seal for an antifriction bearing in which the seal has at least two sealing lips on the sealing edge thereof, the other edge being carried by a bearing race, the first such lip abutting a bearing race and providing a positive closure for the bearing grease chamber, and the second such lip defining a labyrinth closure preventing egress of dirt, dust, etc. when the first lip is in operative abutment for positive sealing, the seal being fixed during operative abutment of the first lip with a bearing race and, when flexure is relaxed by wear of the first lip, the second lip moves to a position of abutment with the bearing race, providing a secondary positive closure for the grease chamber.

PATENTED MAR 30 1971

3,572,857

INVENTOR
Hisao Hasegawa

BY Rommel and Rommel
ATTORNEYS

ANTIFRICTION BEARING SEAL

This invention relates to improvements in seals for antifriction bearings.

In conventional seals for antifriction bearings, in which the seal is carried by the bearing assembly by attachment of one edge of the seal to one bearing race and the other edge of the seal abuts against the other bearing race in providing a positive seal for the grease chamber thereof, the edge of the seal which is in abutment with a bearing race is subjected to considerable wear and will eventually lose its sealing characteristics and permit leakage of grease from the grease chamber. A positive seal of this type is usually efficient during its life span, but must be frequently changed in order to prevent unwanted leakage of grease from the grease chamber.

The primary object of this invention is the provision of a seal for antifriction bearing assembly in which the seal is carried by the bearing assembly by attachment of one edge of the seal to one bearing race and the other edge of the seal is provided with at least two sealing lips, the seal being positioned in the bearing assembly so that one lip is in abutment with a bearing race, providing a positive seal and, when such lip is in abutment with the bearing race, the other lip thereof is spaced apart from the bearing race, providing a secondary labyrinth-type seal, and, when the first-mentioned lip wears to a point that its sealing abutment with the race is slackened, the wearing of the first lip will permit movement of the second lip into abutment with the bearing race, providing a secondary positive seal which is formed upon wear of the first-mentioned lip.

A further object is the provision of a seal having primary and secondary sealing lips and wherein the sealing edge of the seal is flexed on abutment of a first lip with a bearing race and, as flexure is relaxed due to wear of the first lip, a second lip will move into abutment with the bearing race, providing a secondary positive seal.

Other objects and advantages of this invention will become apparent during the course of the following detailed description, taken in connection with the accompanying drawing, forming a portion of this specification, and in which drawing.

Figure 1:
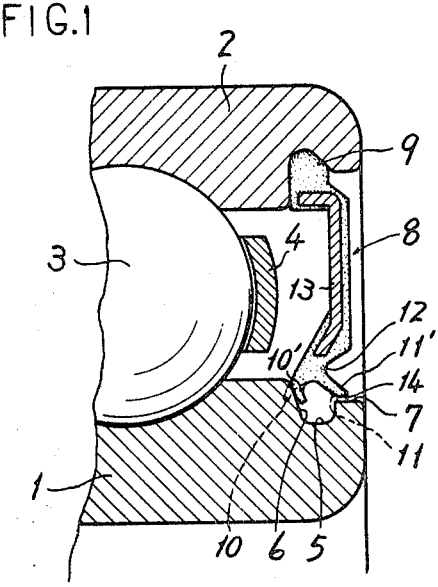
FIG. 1 is a fragmentary sectional view showing one form of my improved antifriction bearing seal mounted in a bearing assembly.

As shown in the drawing, wherein similar reference characters designate corresponding parts throughout the several views, the antifriction bearing assembly preferably includes an inner race 1, outer race 2, bearing 3, and bearing retainer 4, the seal being carried by outer race 2 and inner race 1 having an outer cylindrical surface 7 provided with a sealing groove 5 having an inside wall 6.

Figure 2:
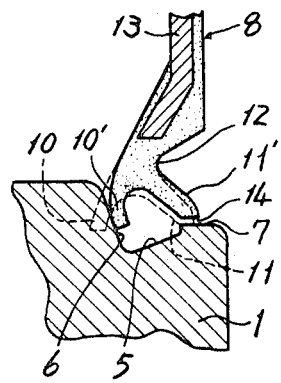
FIG. 2 is an enlarged fragmentary sectional view showing the sealing edge of the form of invention of FIG. 1.

The form of invention as shown in FIGS. 1 and 2 preferably includes a seal 8 having an outer circumferential edge 9 which may be mounted in a seal mounting groove of bearing race 2 for carrying of seal 8 thereby. The inner edge of seal 8 preferably comprises a forklike sealing edge having a pair of diverging branches, one branch comprising an inner lip 10 and the other branch comprising an outer lip 11. At least the sealing edge of seal 8 is flexible, and the outer wall thereof may include a circular groove 12 for regulating flexure of the sealing edge. The balance of the seal is preferably substantially rigid, and a circular reinforcing core 13 may be provided therewithin.

As shown in FIGS. 1 and 2, seal 8 is cooperatively mounted for carrying by the outer race portion in such a manner that inner lip 10 is held in abutment with inside wall 6 of sealing groove 5, providing a positive seal for the grease chamber of the bearing. The position assumed by inner lip 10 on abutment with inside wall 6 is shown by reference character 10'.

As also shown in FIGS. 1 and 2, when inner lip 10 abuts against inside wall 6, the sealing edge of seal 8 is flexed, the degree of such flexure being regulated by circular groove 12, and flexure of the same causing outer lip 11 to be slightly raised above the outer cylindrical surface 7 of inner race 1. This raised position of inner lip 11 is shown by reference character 11'. The raising of outer lip 11 above cylindrical outer surface 7 defines a labyrinth aperture 14 between outer lip 11 and outer cylindrical surface 7.

In the drawing, the relaxed positions of the inner and outer lips 10 are shown in dotted lines in FIGS. 1 and 2.

The seal thus provides a primary positive seal for the grease chamber by abutment of inner leg 10 with inside wall 6 of bearing race 1, labyrinth aperture 14 providing a seal for limiting egress of dust, dirt, etc.

As the antifriction bearing is used, one bearing race thereof rotating with respect to the other, inner lip 10 will be subjected to considerable wear. As lip 10 wears, its positive sealing abutment with inside wall 6 will become less and less, permitting a relaxation of the flexure of the sealing edge, to the point where positive sealing engagement of inner lip 10 will be practically zero. As this occurs, the relaxing of flexure of the sealing edge will cause outer lip 11 to move closer and closer to outer cylindrical surface 7 and, when positive sealing of inner leg 10 reaches or approaches zero, outer leg 11 will be in abutment with outer cylindrical surface 7, forming a secondary positive seal.

Figure 3:
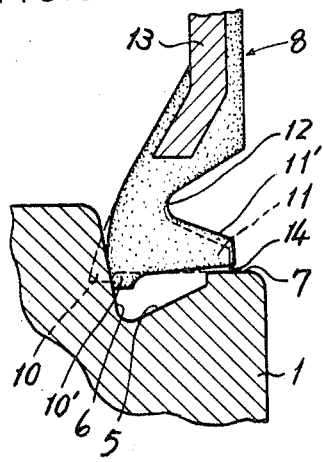
FIGS. 3 and 4 are enlarged fragmentary sectional views of the sealing edge of modifications of my improved bearing seal.

In the modification as shown in FIG. 3, the outermost part of the sealing edge of seal 8 is substantially flat, except for an offset portion adjacent inner lip 10.

Figure 4:
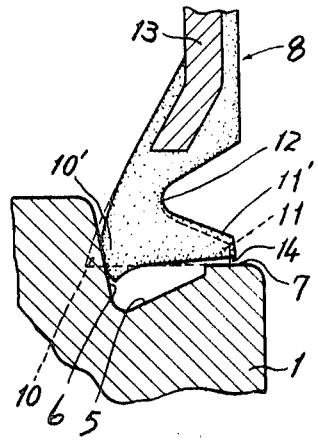

In the form as shown in FIG. 4, the outermost part of the sealing edge of seal 8 is formed flat.

Various changes may be made in the forms of invention herein shown and described without departing from the spirit of the invention or scope of the following claims.

I claim:

1. In an antifriction bearing assembly including spaced relatively rotatable inner and outer race portions, said race portions each having a cylindrical surface facing the other race portion, one having a seal mounting groove therein and the other having a sealing groove therein, and a seal comprising a ringlike flexible member having an outer edge and an inner edge, one edge thereof being cooperatively mounted in said seal mounting groove for carrying of said seal by said race portion having said seal mounting groove, said seal cooperating with said race portions to define one end of a sealed grease chamber between said race portions, said sealing groove being adjacent one end of said grease chamber, the edge of said seal opposite that received by said seal mounting groove being of a dimension to extend across said sealing groove and having an inner lip positioned for abutment with the inside wall of said sealing groove adjacent said sealing chamber and an outer lip positioned to overlie a portion of said cylindrical surface of said race portion having said sealing groove and at the opposite side thereof from that side which is adjacent said grease chamber, abutment of said inner lip of said sealing member with the inside wall of said sealing groove flexing at least the edge of said sealing member having said inner and outer lip portions to space apart said outer lip of said edge having said inner and outer lip portions from said cylindrical surface of said race portion which it overlies in a manner to define a labyrinth aperture between said outer lip and said outer cylindrical surface which it overlies.

2. An antifriction bearing as specified in claim 1 wherein upon wear of said inner lip by abutment of said inner lip with the inside wall of said sealing groove which it abuts, the flexing of said seal by such abutment is relaxed and said outer lip abuts said outer cylindrical surface which it overlies.

3. An antifriction bearing as specified in claim 1 wherein said seal, adjacent said edge thereof having said inner and outer lips includes a circular groove for regulating flexure of such edge by abutment of said inner lip thereof with the inside wall of said sealing groove which it abuts.

4. An antifriction bearing as specified in claim 1 wherein said edge of said seal having said inner and outer lips comprises a forklike edge having a pair of diverging branches, one of said branches comprising said inner lip and the other of said branches comprising said outer lip.